US008874499B2

(12) United States Patent
Tiwari et al.

(10) Patent No.: US 8,874,499 B2
(45) Date of Patent: Oct. 28, 2014

(54) CONSUMER DECISION TREE GENERATION SYSTEM

(75) Inventors: Sandeep Tiwari, Cambridge, MA (US); Peter Gaidarev, Charlestown, MA (US); Su-Ming Wu, Waltham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 13/529,460

(22) Filed: Jun. 21, 2012

(65) Prior Publication Data
US 2013/0346352 A1    Dec. 26, 2013

(51) Int. Cl.
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 5,974,396 A * | 10/1999 | Anderson et al. | 705/7.33 |
| 6,029,195 A * | 2/2000 | Herz | 725/116 |
| 6,836,773 B2 * | 12/2004 | Tamayo et al. | 1/1 |
| 7,003,517 B1 * | 2/2006 | Seibel et al. | 1/1 |
| 7,082,427 B1 * | 7/2006 | Seibel et al. | 707/661 |
| 7,120,629 B1 * | 10/2006 | Seibel et al. | 1/1 |
| 7,315,861 B2 * | 1/2008 | Seibel et al. | 1/1 |
| 7,330,850 B1 * | 2/2008 | Seibel et al. | 1/1 |
| 7,818,286 B2 * | 10/2010 | Chu et al. | 707/600 |
| 8,412,656 B1 * | 4/2013 | Baboo et al. | 706/20 |
| 2001/0014868 A1 * | 8/2001 | Herz et al. | 705/14 |
| 2002/0161778 A1 * | 10/2002 | Linstedt | 707/102 |
| 2004/0024773 A1 * | 2/2004 | Stoffel et al. | 707/102 |
| 2004/0133551 A1 * | 7/2004 | Linstedt | 707/1 |
| 2004/0199484 A1 * | 10/2004 | Smith et al. | 706/52 |
| 2006/0004731 A1 * | 1/2006 | Seibel et al. | 707/3 |
| 2008/0294996 A1 * | 11/2008 | Hunt et al. | 715/739 |
| 2008/0319829 A1 * | 12/2008 | Hunt et al. | 705/10 |
| 2009/0006156 A1 * | 1/2009 | Hunt et al. | 705/7 |
| 2009/0018996 A1 * | 1/2009 | Hunt et al. | 707/2 |
| 2010/0145773 A1 * | 6/2010 | Desai et al. | 705/10 |
| 2010/0228604 A1 * | 9/2010 | Desai et al. | 705/10 |
| 2011/0264617 A1 * | 10/2011 | Eggers et al. | 706/50 |
| 2012/0066125 A1 * | 3/2012 | Ma et al. | 705/44 |
| 2013/0346352 A1 * | 12/2013 | Tiwari et al. | 706/46 |

OTHER PUBLICATIONS

Tanase, "The Retailers' Merchandise Mix Planning and the Process of Category Management," Romanian Distribution Committee Magazine, 2011, vol. 2, issue 2, pp. 55-61.*

* cited by examiner

*Primary Examiner* — Wilbert L Starks
*Assistant Examiner* — Fuming Wu
(74) *Attorney, Agent, or Firm* — Miles & Stockbridge P.C.

(57) ABSTRACT

A system generates a consumer decision tree ("CDT"). The system receives customer purchasing data that includes transactions of a plurality of products each having at least one product attribute. For a product category, the system identifies a plurality of similar products from the purchasing data and one or more attributes corresponding to each similar product. The system assigns the product category as a current level of the CDT, and determines a most significant attribute of the plurality of attributes for the current level. The system forms a next level of the CDT by dividing the most significant attribute into a plurality of sub-sections, where each sub-section corresponds to an attribute value of the most significant attribute. The system then forms a next level of the CDT for each sub-section until a terminal node is identified.

20 Claims, 6 Drawing Sheets

CONSUMER DECISION TREE GENERATION SYSTEM

FIELD

One embodiment is directed generally to a computer system, and in particular to a computer system that generates a consumer decision tree.

BACKGROUND INFORMATION

Buyer decision processes are the decision making processes undertaken by consumers in regard to a potential market transaction before, during, and after the purchase of a product or service. More generally, decision making is the cognitive process of selecting a course of action from among multiple alternatives. Common examples include shopping and deciding what to eat.

In general there are three ways of analyzing consumer purchasing decisions: (1) Economic models—These models are largely quantitative and are based on the assumptions of rationality and near perfect knowledge. The consumer is seen to maximize their utility; (2) Psychological models—These models concentrate on psychological and cognitive processes such as motivation and need recognition. They are qualitative rather than quantitative and build on sociological factors like cultural influences and family influences; and (3) Consumer behavior models—These are practical models used by marketers. They typically blend both economic and psychological models.

One type of consumer behavior model is known as a "consumer decision tree" ("CDT"). A CDT is a graphical representation of a decision hierarchy of customers in a product attribute space for the purchase of an item in a given category. It models how customers consider different alternatives (based on attributes) within a category before narrowing down to the item of their choice, and helps to understand the purchasing decision of the customer. It is also commonly known as a "product segmentation and category structure". CDTs are conventionally generated by brand manufacturers or third party market research firms based on surveys and other tools of market research. However, these methods lack accuracy and can lack authenticity since they may be based on biased data supplied by brand manufacturers.

SUMMARY

One embodiment is a system that generates a consumer decision tree ("CDT"). The system receives customer purchasing data that includes transactions of a plurality of products each having at least one product attribute. For a product category, the system identifies a plurality of similar products from the purchasing data and one or more attributes corresponding to each similar product. The system assigns the product category as a current level of the CDT, and determines a most significant attribute of the plurality of attributes for the current level. The system forms a next level of the CDT by dividing the most significant attribute into a plurality of sub-sections, where each sub-section corresponds to an attribute value of the most significant attribute. The system then assigns each of the sub-sections as the current level, and repeats the determining of the most significant attribute and the forming of the next level of the CDT for each sub-section until a terminal node is identified.

DETAILED DESCRIPTION

One embodiment is a system that automatically generates a consumer decision tree ("CDT") using a retailer's transaction data. The system first calculates similarities for each product and attribute value pair. The system then generates the CDT using similarity values. The CDT, because it can be generated by the retailer themselves, using their own data, is unbiased and objectively determined.

One embodiment generates a CDT to give retailers a "Customer-Centric" approach in managing categories of products. In the past, retailers used to plan their assortment and promotions based on a "Product-Centric" approach. The Product-Centric approach rewards products that are best sellers and punishes those with minimal sales. Inferences were typically made based on historical sales data which was greatly influenced by past assortments and promotions. Retailers gradually realized the shortcomings of the Product-Centric approach and also the fact that customers need to be included in the planning process. This has led many retailers to shift their strategy from the Product-Centric approach to the Customer-Centric approach. In the Customer-Centric approach, retailers identify target customer segments and cater their assortment and promotion to them.

Customer segments are group of customers with similar demographics or purchasing behavior. Product attribute types are the types of features of a given product, such as the product's brand, size, flavor, etc. Product attribute values are the actual features corresponding to a product attribute type, such as a brand of "premium", a size of "large", a flavor of "strawberry", etc.

Known solutions for generating a CDT use an agglomerative (i.e., bottom up) clustering of products where distance between any two products is equivalent to their mutual dissimilarity value. Each node and split in the hierarchical structure can be explained in terms of attributes. However, translating a group of products at every node into attributes can be very tedious process and hard to automate. There frequently may be an instance where a split in the tree cannot be explained by single attribute. Therefore, these known solutions typically rely on human intervention. Further, there is no scoring approach available to quantify the accuracy of the CDT generated using known solutions.

Figure 1:
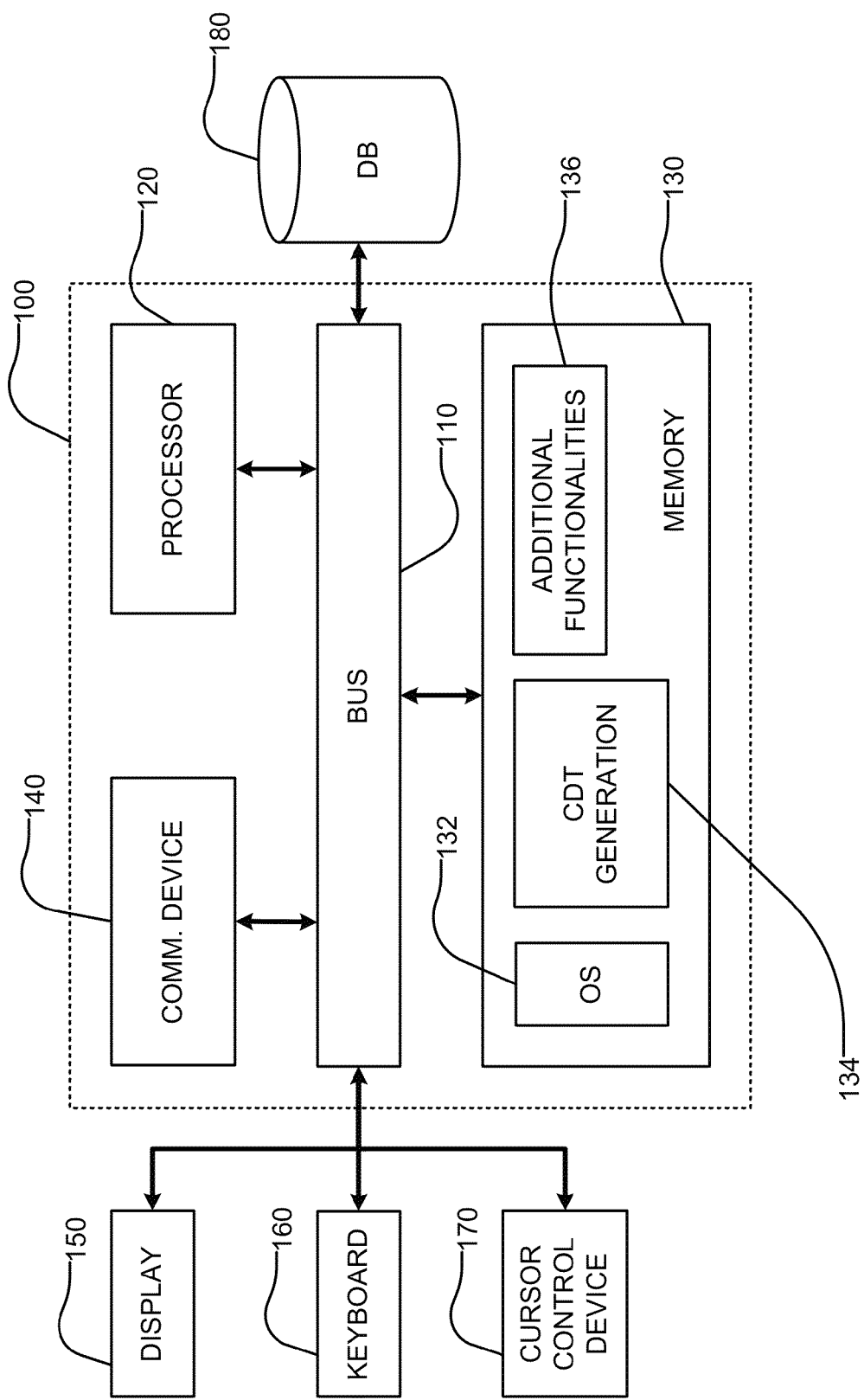
FIG. 1 is a block diagram of a computer system that can implement an embodiment of the present invention.

FIG. 1 is a block diagram of a computer system 100 that can implement an embodiment of the present invention. Although shown as a single system, the functionality of system 100 may be implemented as a distributed system. System 100 may include a bus 110 or other communication mechanism for communicating information, and a processor 120 coupled to bus 110 for processing information. Processor 120 may be any type of general or specific purpose processor. System 100 may further include a memory 130 for storing information and instructions to be executed by processor 120. Memory 130 may be comprised of any combination of random access memory ("RAM"), read only memory ("ROM"), static storage such as a magnetic or optical disk, or any other type of computer readable media. System 100 may further include a communication device 140, such as a network interface card, to provide access to a network. Therefore, a user may interface with system 100 directly, or remotely through a network or any other method.

Computer readable media may be any available media that can be accessed by processor 120 and includes both volatile and nonvolatile media, removable and non-removable media, and communication media. The communication media may include computer readable instructions, data structures, program modules or other data in a modulated data signal such as a carrier wave or other transport mechanism and includes any information delivery media. Processor 120 may be further coupled via bus 110 to a display 150, such as, e.g., a Liquid Crystal Display ("LCD") or the like, for displaying information to the user. A keyboard 160 and a cursor control device 170, such as, e.g., a computer mouse or the like, may be further coupled to bus 110 to enable the user to interface with system 100.

In one embodiment, memory 130 may store software modules that can provide functionality when executed by processor 120. Modules may include an operating system ("OS") 132 that can provides OS functionality for system 100. Modules may further include a consumer decision tree generation module 134 that automatically generates a CDT from retailer consumer data, as disclosed in more detail below. System 100 can be part of a larger system, such as a retail management system or an enterprise resource planning ("ERP") systems. Therefore, system 100 may include one or more additional functional modules 136 to include the additional functionality. In one embodiment, module 136 is the "E-Business Suite" ERP system from Oracle Corp. A database 180 is coupled to bus 110 to provide centralized storage for modules 134 and 136 and store data to be used by modules 134 and 136. In one embodiment, the data includes customer purchasing data generated by a retailer, including for each customer the product attributes of the purchased products. This data can be generated by an ERP system and may be derived from a retailer's loyalty program, credit card information, etc. For example, a grocery store will generate data through its loyalty card program of the specific product purchased by each customer. The stored data on database 180 includes product attribute types and corresponding values.

Figure 2:
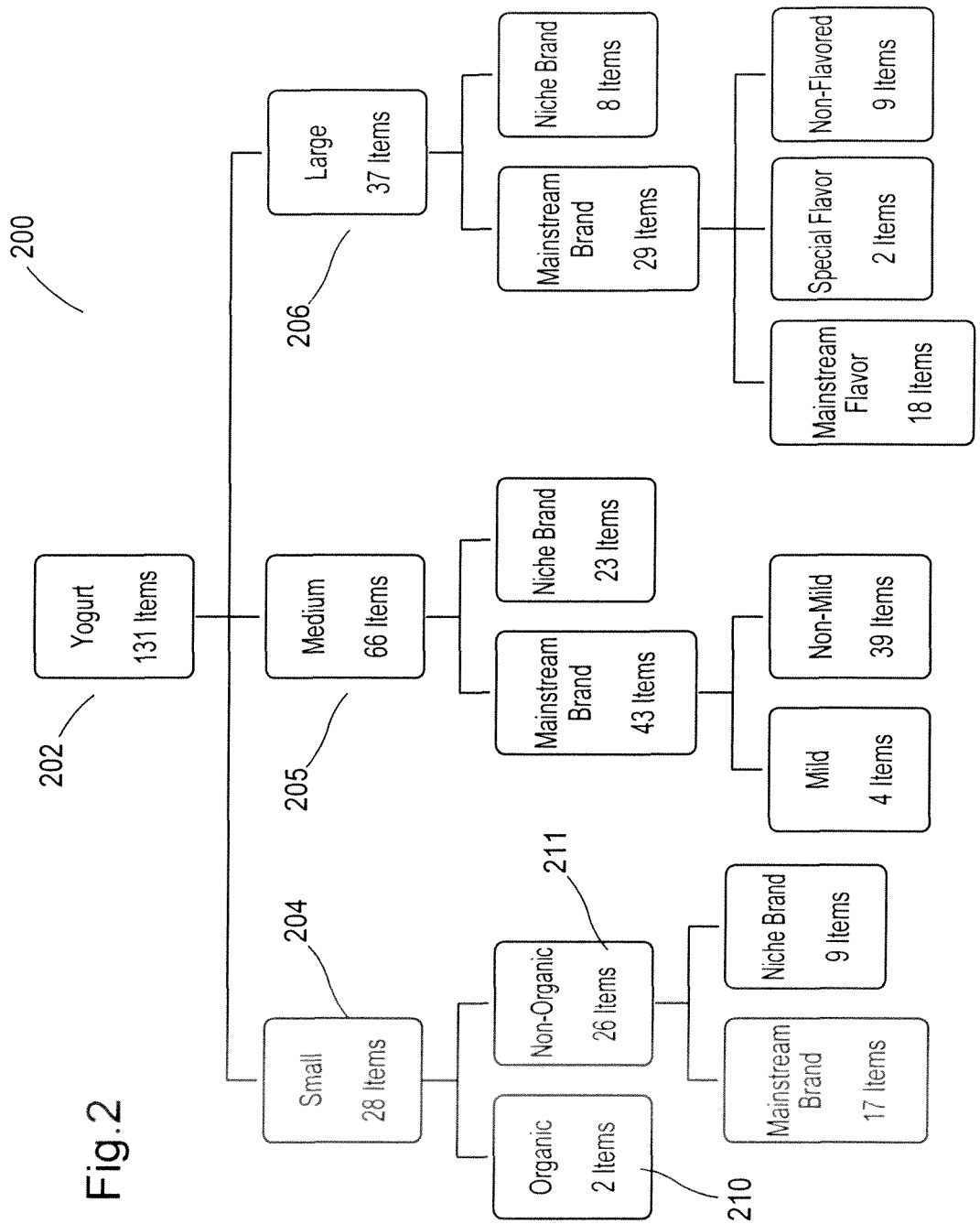
FIG. 2 is an example consumer decision tree ("CDT") for a yogurt product category that is automatically generated by the system of FIG. 1 based on a retailer's transactional data according to one embodiment.

FIG. 2 is an example CDT 200 for a yogurt product category that is automatically generated by system 100 based on a retailer's transactional data according to one embodiment. As shown in FIG. 2, product attributes for the yogurt product category include size, brand, flavor, production method, etc. The attribute values for the "size" product attribute include small, medium and large. The attribute values for the "brand" product attribute include mainstream brand and niche brand. The attribute values for the "production method" production attributes include organic and non-organic. The attribute values for the "flavor" product attribute includes Non-Flavored, Mainstream Flavor and Special Flavor.

CDT 200 provides a retailer with an insight into the decision process of customers when purchasing yogurt. For example, CDT 200 indicates that, among the customers, the size 204-206 of the yogurt product 202 is generally the most important factor during the decision-making process since size is the first level attribute value beneath the category of yogurt. Then, depending on the preferred size, the brand or production method are considered as the second most important factors. For example, for those who prefer a small size, the production method (e.g., organic 210 or non-organic 211) is the second most important factor. However, for those who prefer a medium or large size item, the brand is the second most important factor, and the production method does not have any impact on the decision-making process. Also, the flavor does not have any impact on the decision-making process of those who prefer a small sized yogurt product although the flavor is also considered among those who prefer a medium or large sized yogurt product that are from a mainstream brand.

Figure 3:
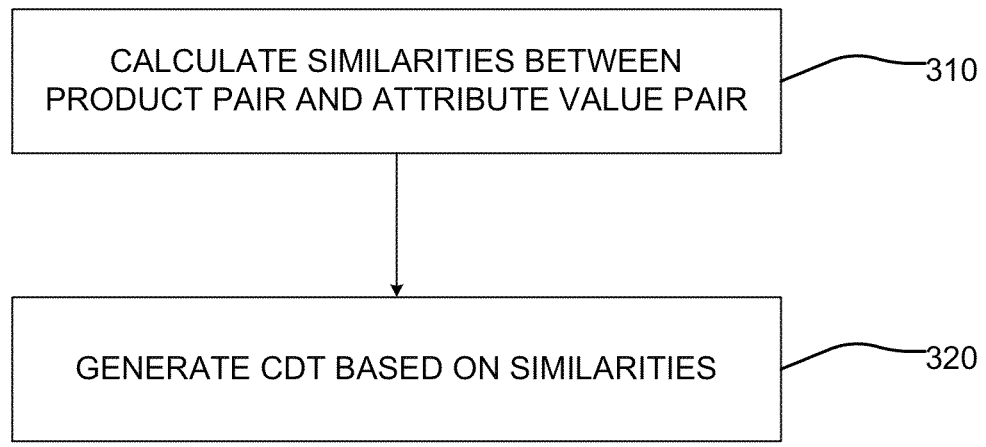
FIG. 3 is a flow diagram of the functionality of the CDT generation module of FIG. 1 when generating a CDT in accordance with one embodiment.

FIG. 3 is a flow diagram of the functionality of CDT generation module 134 of FIG. 1 when generating a CDT in accordance with one embodiment. In one embodiment, the functionality of the flow diagram of FIG. 3 (and FIG. 4 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In general, a CDT for an individual customer cannot be leveraged for any practical purposes due to scalability issues. Therefore, in order to provide meaningful information to a retailer, the CDT in accordance with one embodiment is escalated to embrace a group of customers with similar demographics or purchasing behaviors, which is referred to as a "customer segment." Therefore, a CDT is defined at the customer segment level.

In FIG. 3, at 310, module 134 calculates similarities between each product pair and each attribute value pair. Then, at 320, module 134 generates the CDT based on the similarities from 310. A matrix can be generated from the similarities. In one embodiment, the matrix is a square matrix with each row and column corresponding to each product or attribute value. Each entry of the matrix is the similarity value between the corresponding row product (or attribute value) and column product (or attribute value). The determination of the similarity value is described below.

In calculating the similarities at 310, similarities between each product pair and attribute value pair for a given category are determined. The similarity between a pair of products and a pair of attribute values for a given attribute can be quantified based on the following ideas:

1. If any pair of products were purchased by the same customer anytime during the customer's transaction history, those products are considered similar. The number of such customers can weight the extent of similarity value.

2. If a pair of products were purchased in the same transaction, then products are dissimilar as the customer is probably buying it from a variety seeking objective.

3. The same logic from 1 and 2 above can be used to identify similarity between a pair of attribute values for any given attribute (e.g., the similarity between chocolate and vanilla).

One known approach for determining the similarity between products A and B is as follows:

$$\text{Similarity} = \frac{\text{Number of customers who buy } A \& B - \text{Number of customers who buy } A \& B \text{ in same Basket}}{\text{Number of customers who buy either } A \text{ or } B}$$

However, assume a customer has purchased products A and B always in separate transaction except for one time where the customer bought them together. The above known approach will not count that customer towards product similarity, which can lead to inaccurate results. Therefore, one embodiment includes a factor for each customer which is equal to the proportion of transactions where products A and B were bought separately out of all transactions where either A or B was purchased. The count of customers is then replaced by the sum of this factor over all customers. Thus, in one embodiment, the similarity between a pair of products or attributes (determined at 310 of FIG. 3) is as follows:

$$\text{Similarity/Substitutability} = \frac{\sum_{customers} F * f}{\text{\# who buy } A \text{ or } B}$$

Where A and B can be products or attribute values corresponding to any given attribute, and "F"=1 if the customer has bought both A and B at least once in the customer's transaction history, otherwise F=0:

$F = \delta$(customer bought product $A \& B$ in his transaction history)

Further, "f" is defined as follows:

$$f = \frac{\text{\# of transactions in which customer bought } A \& B \text{ seperately}}{\text{\# of transactions in which customer bought either } A \text{ or } B}$$

$$= 1 - \frac{\text{\# of transactions in which customer bought } A \& B \text{ together}}{\text{\# of transactions in which customer bought either } A \text{ or } B}$$

The dissimilarity between product pairs can be determined as follows:

Dissimilarity=1−Similarity, where Similarity is always between 0 and 1.

Figure 4:
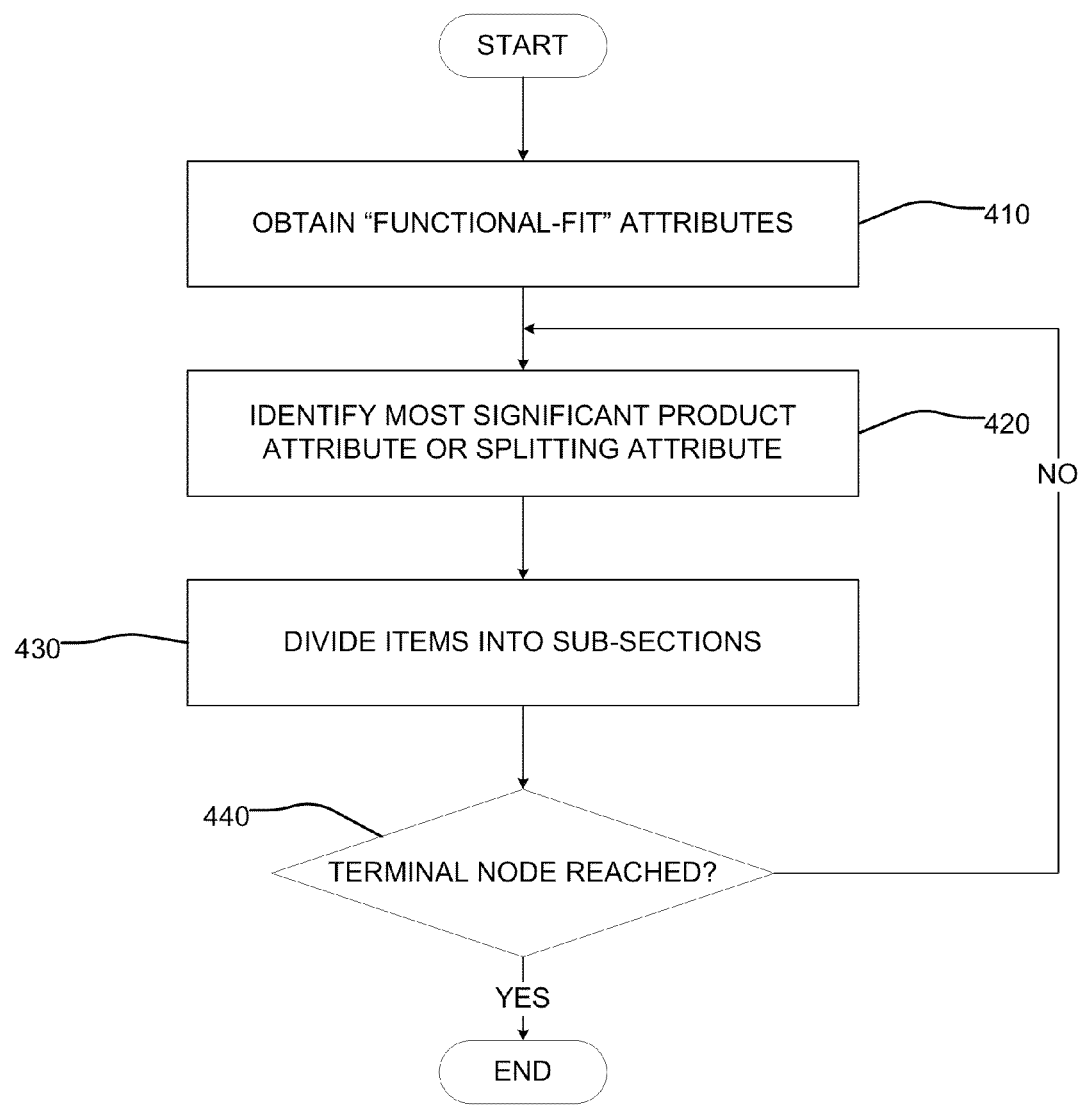
FIG. 4 is a flow diagram of the functionality of the CDT generation module of FIG. 1 when generating a CDT based on similarities in accordance with one embodiment.

FIG. 4 is a flow diagram of the functionality of CDT generation module 134 of FIG. 1 when generating a CDT based on similarities (320 of FIG. 3) in accordance with one embodiment. At 410, it is determined whether there are any functional-fit attributes in the products of the same product category. A functional-fit attribute is a product attribute that does not have any alternatives. For example, a customer who is shopping for wiper blades must purchase blades that fit the corresponding car. Therefore, in the wiper blade product category, the "size" product attribute is determined as the functional-fit attribute. The "size" product attribute could be also a functional-fit attribute for other product categories, for example, tires, air filters, vacuum bags, printer cartridges, etc. However, the same "size" product attribute may not be a functional-fit attribute for other product categories, for example, fruits, soft drinks, etc. In general, functional-fit attributes are typically present in non-grocery items such as accessories, etc. The functional-fit attributes in one embodiment are obtained directly from the generated customer data, and will typically not have to be calculated. For example, a retailer will typically explicitly identify what the "functional fit" attributes are, for example, explicitly stating that size in the case of wiper blades is a functional-fit attribute.

Figure 5:
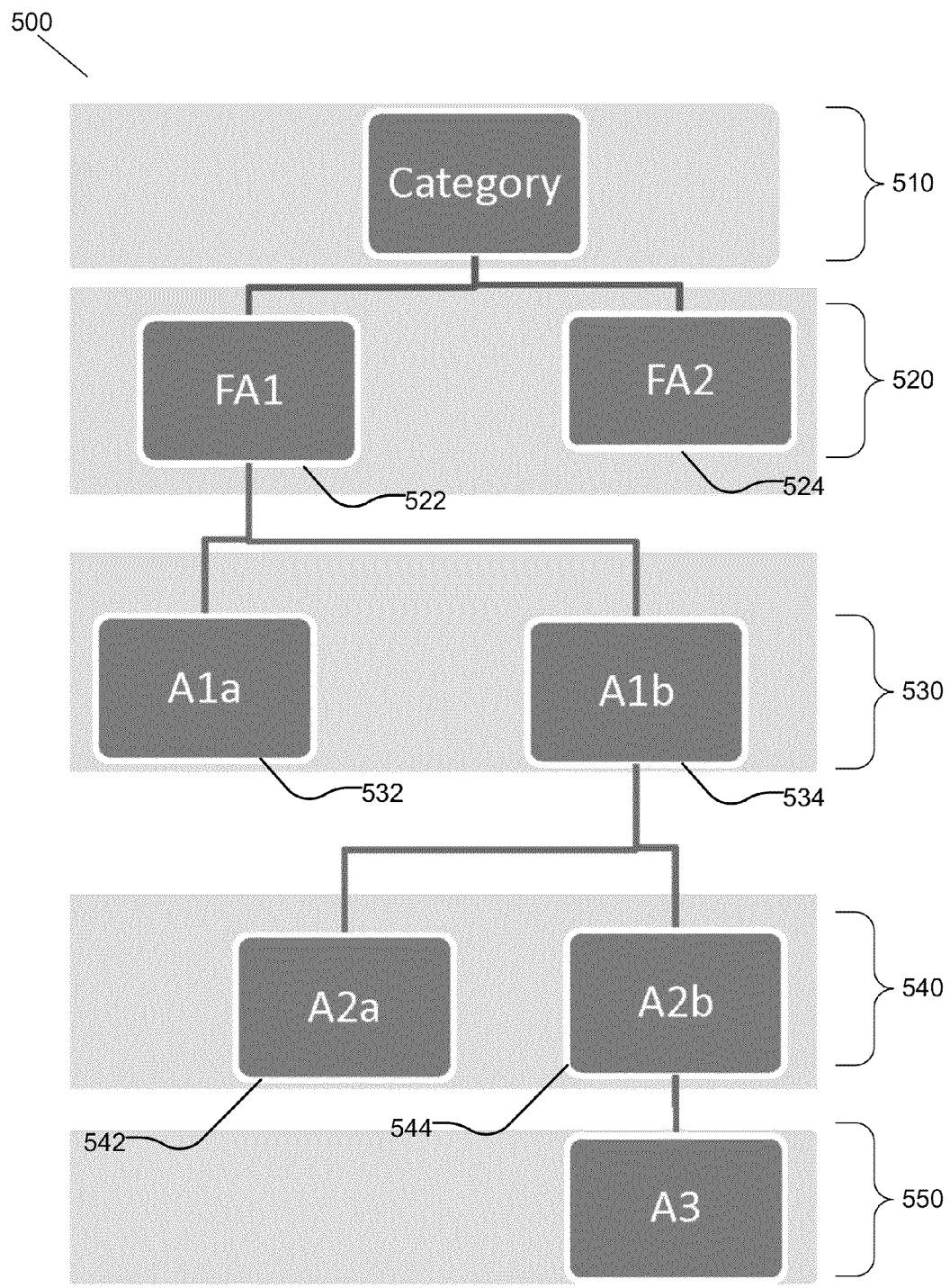
FIG. 5 illustrates a CDT generated in accordance with one embodiment.

After all functional-fit attributes are identified, the functional-fit attributes are automatically placed at the top level of the CDT directly under the product category. FIG. 5 illustrates a CDT 500 generated by module 134 in accordance with one embodiment. CDT 500 has a category level 510, which identifies the product category. For a yogurt product category, "Yogurt" would be displayed in category level 510, as shown in FIG. 2. In another example, for a "Coffee" category, "Coffee" is displayed in category level 510. Then, the functional-fit attributes are placed at a top level 520 of CDT 500. FIG. 5 shows two functional-fit attributes (FA1, FA2) 522, 524 at top level 520. However, for Yogurt or Coffee, there likely would not be any functional-fit attributes.

At 420 of FIG. 4, the most significant attribute or a splitting attribute is then identified. In one embodiment, the most significant attribute is a product attribute whose dissimilarity has the maximum impact on the overall product dissimilarity. For example, the extent of correlation or association between a product dissimilarity and a dissimilarity with respect to each product attribute is calculated. Then, the product attribute whose dissimilarity has the highest correlation/association with the product dissimilarity is determined as the most significant attribute. For example, assume "form" is the most significant attribute for coffee, then this attribute is used for further splitting. Additional details on how to identify the most significant attribute are disclosed below.

At 430, the items are divided into sub-sections, where each sub-section corresponds to a particular attribute value of the attribute identified at 420. For example, when a "form" product attribute is determined to be the most significant attribute for coffee at 420, "form" product attribute is divided into three sub-sections, each corresponding to a particular value of form for coffee: "Bean," "Ground," and "Instant." The sub-sections form a next level 530 in FIG. 5 that is below top level 520. For example, FIG. 5 shows two sub-sections (A1a, A1b) 532, 534 in level 530, which are branched out from functional-fit attribute 522. Steps 420 and 430 is repeated for each sub-section and CDT 500 is expanded until a terminal node is reached (No at 440) for each sub-section. If a terminal node is finally reached for each sub-section (Yes at 440), process 400 is terminated.

As disclosed, the tree is expanded until a terminal node is identified. In one embodiment, the criteria to declare a node as terminal is as follows:

1. No significant attribute is identified (i.e., none of the attribute dissimilarity has any association with product dissimilarity.
2. The number of items in a node <x % of the total items in a product category, where "x" is a tuning parameter which caps the size of the tree. In one embodiment, the default value for x is 10.
3. The Average Dissimilarity ("AD") (i.e., the average over all possible pairs of products in the node) of a child node is greater than its parent node. Two possible sub-cases as as follows:
    a. If all the children nodes have their AD values greater than the parent node then the parent node is declared the terminal node.
    b. If some of the children nodes have their AD values greater than the parent node then those nodes are terminated and other children nodes are expanded in regular fashion.

After the CDT has been generated, as shown in FIGS. 4 and 5, the generated CDT can be evaluated or scored in one embodiment. As disclosed in conjunction with FIG. 3, the generation of the CDT is a two-step/phase process: generating similarities, and utilizing the similarities to generate the CDT. To evaluate the CDT, in one embodiment the two phases 310 and 320 in FIG. 3 are decoupled and it is assumed that similarity values are perfect.

The CDT generation process can be characterized as a constrained divisive clustering of products. Therefore, the score of the resulting CDT in one embodiment is logically a comparison with the best and worst possible clustering solutions. In one embodiment, a weighted average dissimilarity ("WAD") can be used to evaluate the quality of clustering solution. WAD is a weighted average of an average dissimilarity over all clusters where the weight is a number of items in each cluster. For the CDT, the terminal nodes constitute a set of clusters. The WAD can be determined as follows:

$$WAD = \frac{\sum_i N_i AD_i}{\sum_i N_i},$$

where $N_i$ and $AD_i$ are the number of items and average dissimilarity in cluster "i", respectively. The upper bound or "worst" solution for WAD is all items in one bucket, or no clustering, since the whole product group is presented as a single cluster. The lower bound or "best" or optimum solution for WAD is unconstrained clustering with the same number of clusters as the number of terminal nodes in a tree.

In one embodiment, the CDT score is defined as the percentage of gap filled between the worst solution and the best solution by the actual solution. This approach provides a more complete picture then merely reporting an absolute difference between the actual solution and the best solution. Therefore, the CDT score can be formulated as follows:

$$Score = \frac{WAD_{worst} - WAD_{actual}}{WAD_{worst} - WAD_{best}} \times 100\%.$$

Figure 6:
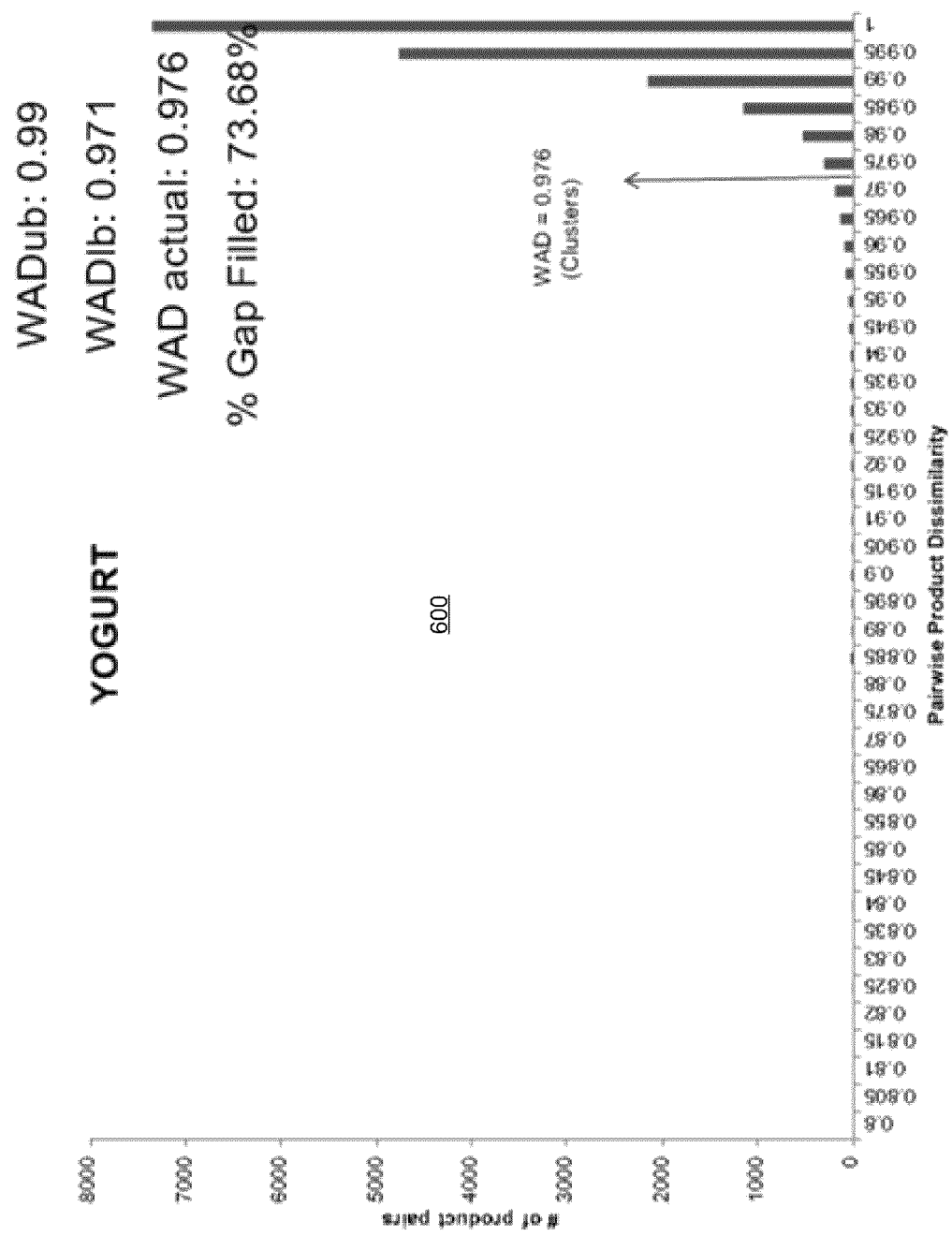
FIG. 6 is a graph of the number of product pairs vs. pairwise product dissimilarity for the yogurt CDT of FIG. 2.

FIG. 6 is a graph 600 of the number of product pairs vs. pairwise product dissimilarity for the yogurt CDT of FIG. 2. Graph 600 is the result of scoring CDT 200 of FIG. 2 as disclosed above. As shown, the upper bound of WAD is 0.99, the lower bound of WAD is 0.971, and WAD by CDT is 0.976. Therefore there is a 73.68% gap filled between upper and lower. The goal of a CDT is to achieve clusters with relatively low pairwise product dissimilarities within a cluster. As shown in FIG. 6, the Weighted Average Dissimilarity of CDT 200 is less than the dissimilarity values between the majority of individual product pairs. Therefore, CDT 200 can be considered very effective.

In one embodiment, in conjunction with 420 of FIG. 4, the most significant product attribute is identified. A typical product category may include approximately 50 k product pairs. A person cannot reasonably store a comparison between all product pairs. Instead, a person typically stores a comparison in attribute space (i.e., a person compares products solely in terms of attributes). Therefore, it can be assumed that product similarities are a function of similarities with respect to their attributes, and a dissimilarity between product pair is a function of attribute dissimilarities. Therefore, assume:

$$P_1 \rightarrow f(A_{11}, A_{12}, A_{13})$$

$$P_2 \rightarrow f(A_{21}, A_{22}, A_{23})$$

Where, $P_i$ is the $i^{th}$ product and $A_{ij}$ is the $i^{th}$ attribute of $i^{th}$ product. The dissimilarity between pair of products and attributes can be denoted as follows:

$$\Delta P \rightarrow diss(P_1, P_2), \Delta A_i = diss(A_{1i}, A_{2i}), \Delta P \rightarrow f(\Delta A_1, \Delta A_2, \Delta A_3), \text{ where}$$

$\Delta A_i$=Dissimilarity between product pair with respect to attribute 'i'. This can also be referred to as the pairwise dissimilarity of attribute 'i'.

The most significant attribute in one embodiment is the one whose dissimilarity has maximum impact on overall product dissimilarity. In order to find that, the correlation or association metrics between product dissimilarity and dissimilarity with respect to each attribute is calculated. Then, the attribute whose dissimilarity has the highest correlation/association with product dissimilarity is the most significant attribute.

Correlation is a linear dependence between two variables. "Pearson's Correlation Coefficient" is a well-known correlation metric. "Association" is a much broader term which encompasses any form of linkage between two variables. "Spearman Rank Correlation" is a well-known association metric. Other common metrics to find dependence between variables include "Entropy" and "Cosine" similarity. Embodiments of the present invention can use any known or other metrics for correlation and association.

Before these metrics can be evaluated, there is a need to verify if correlation or association really exists. In one embodiment, the verification comprises performing hypothesis testing by setting the null hypothesis of "No Correlation" or "No Association". Detail of the hypothesis testing are as follows:

(1) Null Hypothesis, H0: No Correlation between product dissimilarity and dissimilarity in a given attribute space:

$$\text{Test Statistic} = \rho_{xy} \sqrt{\frac{n-2}{1-\rho_{xy}^2}}$$

This test statistic follows t-distribution with n-2 degrees of freedom, where n is the number of data points. The Null Hypothesis can be rejected with Significance level, Alpha=0.05.

(2) Null Hypothesis, H0: No Association between product dissimilarity and dissimilarity in a given attribute space: When 20<n<40:

$$\text{Test Statistic} = r_s \sqrt{\frac{n-2}{1-r_s^2}}$$

with t-distribution of n-2 degrees of freedom, when n>=40. Test Statistic=$r_s\sqrt{n-1}$ with standard normal distribution. Null Hypothesis can be rejected with Significance level, Alpha=0.05.

The attributes for which collinearity and association is verified (by hypothesis testing), metrics are obtained as follows:

Pearson's Correlation Coefficient:

$$\rho_{xy} = \frac{\text{Cov}(x, y)}{\sqrt{\text{Var}(x)} \sqrt{\text{Var}(y)}}$$

Where x and y are ΔP and ΔA respectively.

Spearman Rank Correlation:

$$r_s = 1 - \frac{6 \sum_i d_i^2}{n(n^2 - 1)}$$

Where $d_i$ is the difference between the ranks of data point in fields ΔP and ΔA and n is the total number of data points.

Embodiments rank the attributes based on these metrics and the attribute with the largest value is the most significant attribute. If the attributes were independent of each other the CDT would be symmetric. In that case it is relatively easy to obtain attribute ranking by significance and hence the tree in one step. However in reality, attributes are typically dependent on each other. The combination of attributes is constrained by existing products and not all possible combinations of attributes are possible. Therefore, an assumption of independence of attributes can lead to inaccurate results. For example, some brands of Yogurt come only non-flavored, which indicates strong dependence of flavor on brand.

To deal with the inter-dependence of attributes, one embodiment follows a "greedy" approach. At each node the most significant attribute is identified and then nodes at the next level are created corresponding to attribute values of identified significant attribute. Similar analysis is continued on subsequent nodes to grow the tree. The resulting tree might be unbalanced or asymmetric.

As disclosed, embodiments automatically generate a consumer decision tree using a retailer's transaction data. The system first calculates similarities for each product and attribute value pair and then generates the CDT using similarity values.

Known solutions for generating a CDT use an agglomerative (i.e., bottom up) clustering of products where distance between any two products is equivalent to their mutual dissimilarity value. In contrast, in embodiments of the present invention, each node and split in the hierarchical structure can be explained in terms of attributes. Embodiments involve constrained divisive clustering of products where partitioning/split is always decided by attributes. Since splits are based on attributes, nodes can always be associated with an attribute, which allows embodiments to be fully automated and executed by a computer system. Further, embodiments can also score the CDT to assess the quality of a CDT. Embodiments can work for any product, but more effectively can be used by retailers where customers make frequent purchases, such as a grocery store, so that the data used to generate the CDT is robust.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to generate a consumer decision tree (CDT) comprising a plurality of nodes, the generating of the consumer decision tree comprising:
    receiving customer purchasing data comprising transactions of a plurality of products each having at least one product attribute;
    for a product category, identifying a plurality of similar products from the purchasing data and one or more attributes corresponding to each similar product;
    assigning the product category as a current level of the CDT;
    determining a most significant attribute of the plurality of attributes for the current level, the determining the most significant attribute comprising determining a correlation between a dissimilarity between a product pair and a dissimilarity for each of the attributes, and then selecting the attribute having a dissimilarity with the highest correlation with the product dissimilarity;
    forming a next level of the CDT by dividing the most significant attribute into a plurality of sub-sections, wherein each sub-section corresponds to an attribute value of the most significant attribute; and
    assigning each of the sub-sections as the current level and repeating the determining the most significant attribute and forming the next level of the CDT for each sub-section until a terminal node is identified.

2. The computer readable medium of claim 1, wherein the customer purchasing data is generated by a loyalty program of a retailer.

3. The computer readable medium of claim 1, wherein identifying the plurality of similar products from the purchasing data having a plurality of customers comprises:
    designating a first pair of products comprising a first product and a second product as similar when purchased by a first customer anytime during a transaction history of the first customer;
    designating the first pair of products as dissimilar when purchased by a second customer in a same transaction;
    for each of the customers, generating a factor comprising a proportion of transactions where the first pair of product out of all transactions where either the first product or the second product was purchased.

4. The computer readable medium of claim 1, wherein the customer purchasing data is generated by an enterprise resource planning system.

5. The computer readable medium of claim 1, further comprising:
    identifying functional-fit attributes for the product category;
    assigning the functional-fit attributes as the first level of the CDT directly below the product category.

6. The computer readable medium of claim 1, wherein the terminal node is identified when no significant attribute is identified.

7. The computer readable medium of claim 1, wherein the terminal node is identified when a number of items in a node is less than a predetermined percentage of the total items in the product category.

8. The computer readable medium of claim 1, wherein the terminal node is identified when an average dissimilarity of a child node is greater than a corresponding parent node.

9. The computer readable medium of claim 1, further comprising generating a score of the CDT.

10. A computer implemented method for generating a consumer decision tree (CDT) comprising a plurality of nodes, the method comprising:
    receiving customer purchasing data comprising transactions of a plurality of products each having at least one product attribute;
    for a product category, identifying a plurality of similar products from the purchasing data and one or more attributes corresponding to each similar product;
    assigning the product category as a current level of the CDT;
    determining a most significant attribute of the plurality of attributes for the current level, the determining the most significant attribute comprising determining a correlation between a dissimilarity between a product pair and a dissimilarity for each of the attributes, and then selecting the attribute having a dissimilarity with the highest correlation with the product dissimilarity;
    forming a next level of the CDT by dividing the most significant attribute into a plurality of sub-sections, wherein each sub-section corresponds to an attribute value of the most significant attribute; and assigning each of the sub-sections as the current level and repeating the determining the most significant attribute and forming the next level of the CDT for each sub-section until a terminal node is identified.

11. The method of claim 10, wherein identifying the plurality of similar products from the purchasing data having a plurality of customers comprises:
designating a first pair of products comprising a first product and a second product as similar when purchased by a first customer anytime during a transaction history of the first customer;
designating the first pair of products as dissimilar when purchased by a second customer in a same transaction; and
for each of the customers, generating a factor comprising a proportion of transactions where the first pair of product out of all transactions where either the first product or the second product was purchased.

12. The method of claim 10, wherein the terminal node is identified when no significant attribute is identified.

13. The method of claim 10, wherein the terminal node is identified when a number of items in a node is less than a predetermined percentage of the total items in the product category.

14. The method of claim 10, wherein the terminal node is identified when an average dissimilarity of a child node is greater than a corresponding parent node.

15. The method of claim 10, further comprising generating a score of the CDT.

16. A consumer decision tree (CDT) generation system comprising:
a processor;
a memory coupled to the processor and storing instructions that cause the processor to:
receive customer purchasing data comprising transactions of a plurality of products each having at least one product attribute;
for a product category, identify a plurality of similar products from the purchasing data and one or more attributes corresponding to each similar product;
assign the product category as a current level of the CDT;
determine a most significant attribute of the plurality of attributes for the current level, the determining the most significant attribute comprising determining a correlation between a dissimilarity between a product pair and a dissimilarity for each of the attributes, and then selecting the attribute having a dissimilarity with the highest correlation with the product dissimilarity;
form a next level of the CDT by dividing the most significant attribute into a plurality of sub-sections, wherein each sub-section corresponds to an attribute value of the most significant attribute; and
assign each of the sub-sections as the current level and repeating the determine the most significant attribute and form the next level of the CDT for each sub-section until a terminal node is identified.

17. The system of claim 16, wherein the identify the plurality of similar products from the purchasing data having a plurality of customers comprises:
designate a first pair of products comprising a first product and a second product as similar when purchased by a first customer anytime during a transaction history of the first customer;
designate the first pair of products as dissimilar when purchased by a second customer in a same transaction; and
for each of the customers, generate a factor comprising a proportion of transactions where the first pair of product out of all transactions where either the first product or the second product was purchased.

18. The system of claim 16, wherein the terminal node is identified when no significant attribute is identified.

19. The system of claim 16, wherein the terminal node is identified when a number of items in a node is less than a predetermined percentage of the total items in the product category.

20. The system of claim 16, wherein the terminal node is identified when an average dissimilarity of a child node is greater than a corresponding parent node.

* * * * *